March 18, 1941.     R. D. GARTRELL     2,235,148
METHOD OF MAKING RUBBER PRINTING PLATES
Filed April 3, 1936
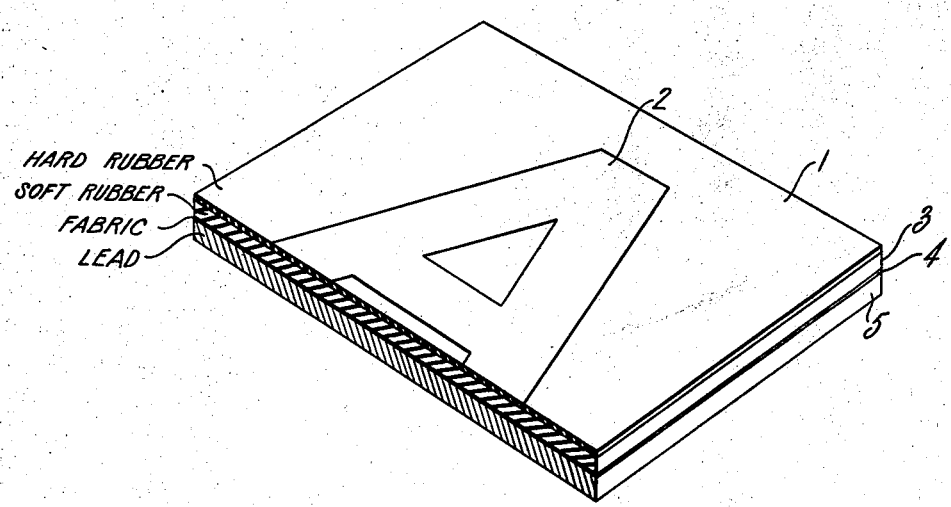
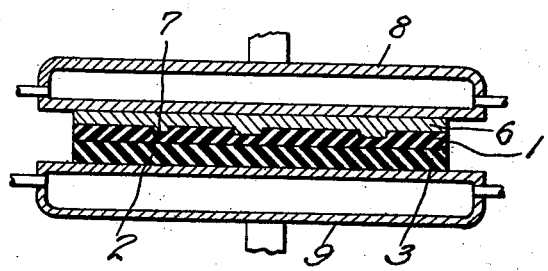
INVENTOR.
ROBERT D. GARTRELL
BY
ATTORNEY.

Patented Mar. 18, 1941

2,235,148

UNITED STATES PATENT OFFICE 2,235,148

METHOD OF MAKING RUBBER PRINTING PLATES

Robert D. Gartrell, Oakland, N. J., assignor, by mesne assignments, to United States Rubber Company, New York, N. Y., a corporation of New Jersey Application April 3, 1936, Serial No. 72,456

3 Claims. (Cl. 18—59)

My invention relates to methods of making rubber printing plates and more particularly to methods of making rubber printing plates having impression carrying surfaces of vulcanized hard rubber.

Heretofore in the manufacture of hard rubber printing plates it has been the practice to superpose upon a body of unvulcanized hard rubber componnd a matrix bearing a negative impression of the design which is to be reproduced in the rubber. The assembly is then subjected to heat and pressure such that the rubber printing face is molded while the rubber is in the plastic unvulcanized condition and the molded rubber is thereupon vulcanized to hard rubber while maintained in contact with the matrix. It is also customary to provide the body of unvulcanized hard rubber compound with a backing layer of slow-curing soft rubber compound which becomes vulcanized and united to the hard rubber layer simultaneously with the vulcanization of the latter, whereby there is produced a hard rubber printing plate having a resilient cushion layer of soft rubber integral therewith. However, since hard rubber compounds require much longer vulcanization periods than soft rubber compounds, the soft rubber, particularly that adjacent to the interface of the two rubber layers, becomes badly over-cured during the time required for curing the adjacent hard rubber, and this condition of overcure is accentuated by the migration of free sulphur from the hard rubber compound into the soft rubber compound during the cure. As a consequence the cushion is liable to age badly and become hard and brittle, thereby losing its cushioning properties and tending to crack and separate from the hard rubber.

Prior methods have a further disadvantage in that matrices are tied up for the full period of the hard rubber cure, the production of printing plates from each matrix being accordingly very slow.

By my invention I am able to produce hard rubber printing plates rapidly and economically, and with a pick turnover of matrices. Thus the number of plates which I can make in one hour from a single matrix at least equals the number which could be made by former methods in a whole working day from one matrix. Further, my improved printing plates are characterized by having an integral soft rubber cushion which is permanently resilient, has no tendency to peel off or separate from the hard rubber, and is uniformly cured from face to face throughout the cushion, there being no zone of extreme over-cure in the soft rubber adjacent to the soft-rubber-hard-rubber interface.

In the manufacture of a printing plate according to my invention I utilize the property of vulcanized hard rubber whereby it can be made to undergo thermoplastic flow and permanent deformation by the application of heat and pressure. Accordingly my invention broadly comprises forming a printing surface on a hard rubber printing plate by disposing a vulcanized hard rubber blank in contact with a matrix bearing in negative relief the desired design, and subjecting the assembly to heat and pressure such that the hard rubber undergoes thermoplastic flow and the surface thereof conforms exactly to the surface of the matrix. The hard rubber plate is then removed from the matrix and attached to any desired backing.

In the preferred embodiment of my invention, I first apply to the back of the vulcanized hard rubber blank, by means of an intermediate layer of a suitable adhesive, a layer of unvulcanized fast-curing soft rubber compound. I then dispose the laminated assembly with the hard rubber face in contact with a matrix as above, and subject the assembly to heat and pressure at an elevated temperature and for a period of time such that the hard rubebr is rendered thermoplastic and conforms exactly to the surface of the matrix and the soft rubber compound concurrently becomes uniformly vulcanized throughout its thickness, and united to the hard rubber plate. As the time required in the operation is dependent only upon the rate of vulcanization of the cushioning rubber, a fast-curing rubber compound may be used for the cushion without danger of over-curing. Accordingly, the duration of the molding operation may be chosen so as to impart an optimum cure and optimum age-resisting characteristics to the cushion layer. Under such circumstances the hard rubber plate may be given an impression and become united to the cushion in a period of time of, for example, from three to fifteen minutes as compared with at least an hour in the previous processes.

The accompanying drawing illustrates the invention, in which:

Fig. 1 is a perspective view of a printing plate made according to a method embodying my invention; and—

Fig. 2 is a cross-section showing the preparation of a printing plate according to the present method.

In the drawing a layer or plate 1 of vulcanized hard rubber, bearing a printing impression 2, is integrally united to a cushion layer 3 of soft rubber which, in turn, is preferably provided with a backing 4 of rubberized fabric. The rubberized fabric may be secured to the surface of a base 5, here illustrated as a lead plate for completing the printing plate. If desired, coatings of adhesive, e. g., rubber adhesive (not shown), may be applied to the various layers 1, 3, 4 and 5 in assembling the laminated structure. Wide variation in the choice of suitable thicknesses of the various layers is permissible, and the following dimensions are merely illustrative: the thickness of the hard rubber layer 1 may be on the order of from .010 to .030 inch; that of the cushioning rubber 3 may be on the order of from .050 to .070 inch; that of the fabric layer 4 may be on the order of .010 inch; and that of the backing 5 may be on the order of .060 inch. The depth of the impressions in the hard rubber face may vary from .001 to .002 of an inch for half-tones; for reproductions of type the depth may be of the order of .01 to .03 inch, in which case portions of the hard rubber layer may be depressed into the underlying soft rubber cushion layer without damage to the continuity of the hard rubber layer during the impression-molding operation.

In the manufacture of the printing plate the layer 1 is previously vulcanized, either completely, or at least to such an extent that during the subsequent vulcanization of the layer 3 the vulcanization of the hard rubber will be completed. Upon the plate so prepared is superposed a matrix, such as a hardened synthetic resin matrix 6, having a surface 7 which will impress upon the hard rubber the desired design, which may, for example, be a reproduction of type, electroplate, zinc cut, engraving, etc. The complete assembly is then placed in a press between heated platens 8 and 9 and subjected to heat and pressure for a short period of time as disclosed herein, the manufacture of the printing plate being then completed by removal of the matrix. The opposite face of the plate is preferably coated with adhesive, e. g., a solvent composition comprising rubber or rubber derivative, for securing the plate to the cushion layer 3 of soft rubber composition. The fabric layer 4 may be placed beneath the cushion layer 3, with an interposed layer of rubber adhesive, if desired, and, preferably, the base 5 is placed beneath the fabric layer 4. The mold is then closed and subjected to a vulcanizing temperature for such period of time that the cushioning layer 3 is vulcanized and at the same time the hard rubber layer 1 is rendered plastic to receive its impression 2.

As the molding time is dependent solely upon the time required to cure the cushioning rubber 3, the latter is not subjected to a long vulcanizing operation, such as is required to vulcanize a hard rubber stock, nor to the migration of sulphur from the hard rubber stock to the soft rubber stock thereby producing uneven curing in the latter. The assembly may be vulcanized and the impression given to the previously vulcanized plate 1 in a period of five minutes as against an hour heretofore required when the hard rubber was completely vulcanized in association with the cushioning stock.

The expression "hard rubber" as used in the specification and claims is to be understood in its proper sense as referring to the materials commonly designated as such, viz., ebonite, or rubber which has been vulcanized with about 30 percent or more of sulphur, and is not to be confused with soft-vulcanized rubber of low sulphur content having its hardness increased by the incorporation of inert fillers.

While I have shown and described a present preferred method of practicing my invention, it is to be understood it may be otherwise practiced within the spirit thereof and the scope of the appended claims.

Having thus described my invention, what I claim and desire to protect by Letters Patent is:

1. In the method of manufacturing printing plates the steps comprising vulcanizing a plate of hard rubber composition until hard, positioning the plate between a matrix and a cushioning body of unvulcanized soft rubber and applying heat and pressure to the assembly whereby to render the vulcanized body of hard rubber plastic to receive an impression from the matrix and simultaneously to vulcanize the soft rubber body to the hard rubber plate.

2. The method of producing printing plates which comprises superposing a sheet of hard rubber composition which has been vulcanized until hard upon a sheet of unvulcanized fast-curing soft-rubber composition with a film of adhesive interposed therebetween, placing in contact with the hard rubber face a matrix bearing in negative relief the design to be reproduced in the hard rubber, and subjecting the assembly to heat and pressure at a sufficiently elevated temperature and for a period of time such that the hard rubber undergoes thermoplastic flow, whereby the design of the matrix is impressed into the hard rubber face, and the soft-rubber cushion layer becomes uniformly vulcanized and integrally united to the back of the hard rubber plate.

3. In the method of manufacturing printing plates, the concurrent steps comprising vulcanizing a cushion of soft unvulcanized rubber to one face of a plate of vulcanized hard rubber composition, simultaneously rendering the opposite face of the plate sufficiently plastic to receive an impression, and simultaneously impressing a design into the face of said plate.

ROBERT D. GARTRELL.